United States Patent
Zhang et al.

(10) Patent No.: US 8,483,464 B2
(45) Date of Patent: Jul. 9, 2013

(54) SYSTEM AND METHOD FOR DETECTING AND CORRECTING REGISTRATION MISALIGNMENT OF MR PERFUSION IMAGES

(75) Inventors: Li Zhang, Skillman, NJ (US); Christophe Chefd'hotel, Jersey City, NJ (US)

(73) Assignee: Siemens Aktiengesellschaft, Munich (DE)

( * ) Notice: Subject to any disclaimer, the term of this patent is extended or adjusted under 35 U.S.C. 154(b) by 450 days.

(21) Appl. No.: 12/897,849

(22) Filed: Oct. 5, 2010

(65) Prior Publication Data

US 2011/0311121 A1 Dec. 22, 2011

Related U.S. Application Data

(60) Provisional application No. 61/249,379, filed on Oct. 7, 2009.

(51) Int. Cl.
*G06K 9/00* (2006.01)
*G06K 9/32* (2006.01)

(52) U.S. Cl.
USPC .......................................... 382/131; 382/294

(58) Field of Classification Search
None
See application file for complete search history.

(56) References Cited

U.S. PATENT DOCUMENTS

| | | | | |
|---|---|---|---|---|
| 5,690,106 A | * | 11/1997 | Bani-Hashemi et al. | 600/425 |
| 7,653,264 B2 | * | 1/2010 | Hero et al. | 382/294 |
| 7,936,947 B1 | * | 5/2011 | Rueckert et al. | 382/294 |
| 2011/0280461 A1 | * | 11/2011 | Bystrov et al. | 382/131 |

OTHER PUBLICATIONS

Marsland, Stephen, Carole Twining, and Chris Taylor. "Groupwise non-rigid registration using polyharmonic clamped-plate splines." Medical Image Computing and Computer-Assisted Intervention—MICCAI 2003: 771-779.*
Lilla Zollei, et al. "Efficient Population Registration of 3D Data," in LNCS Computer Vision of Biomedical Image Applications (ICCV), vol. 3765, pp. 291-301, 2005.
Li Zhang, et al., "Group-Wise Registration for MR Brain perfusion Images," pp. 1-7, Sep. 4, 2009.
Mark Jenkinson, et al., "Improved Optimization for the Robust and Accurate Linear Registration and Motion Correction of Brain Images," NeuroImage 17, pp. 825-841, 2002.

* cited by examiner

*Primary Examiner* — Shefali Goradia
(74) *Attorney, Agent, or Firm* — Donald B. Paschburg; F. Chau & Associates, LLC

(57) ABSTRACT

A method for correcting registration misalignment in magnetic resonance perfusion images includes receiving a time series of magnetic resonance images of an anatomical organ, each image comprising a plurality of intensities defined on an N-dimensional domain of points, performing a first group-wise registration of all images in the time series of images using a pair-wise registration as an initialization, detecting a misaligned image from the group-wise registration by analyzing a total variation of intensity differences between consecutive images, and correcting the misaligned image by optimizing a second group-wise energy function over registration parameters of the misaligned image.

16 Claims, 8 Drawing Sheets

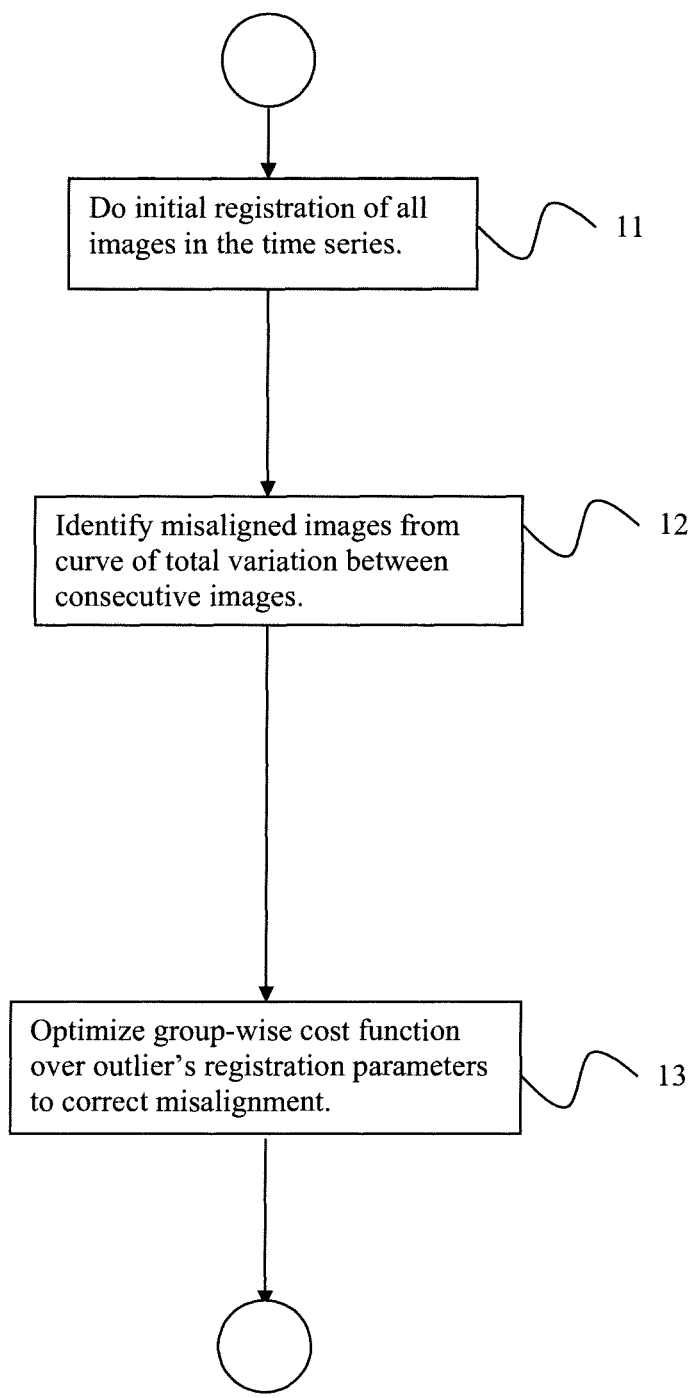

SYSTEM AND METHOD FOR DETECTING AND CORRECTING REGISTRATION MISALIGNMENT OF MR PERFUSION IMAGES

CROSS REFERENCE TO RELATED UNITED STATES APPLICATIONS

This application claims priority from "Misalignment detection and correction for registration of MR brain perfusion images", U.S. Provisional Application No. 61/249,379 of Zhang, et al., filed Oct. 7, 2009, the contents of which are herein incorporated by reference in their entirety.

TECHNICAL FIELD

This disclosure is directed to the registration of digital magnetic resonance (MR) perfusion images.

DISCUSSION OF THE RELATED ART

For MR perfusion studies, such as brain perfusion, a series of scans are acquired over a span of time for functional or pathological analysis. Because motionless images are needed for reliable diagnostic measurement in such applications, image registration is typically performed to compensate for the commonly presented patient motion. In a series of images being registered, there are often one or several images whose intensity distribution differs from the others as a result of contrast enhancement, changing acquisition protocols, or intra-scan motion artifacts. For example, when the bolus of a contrast agent arrives, the perfusion images become much brighter than the ones before, and a pair-wise registration using the first image as the reference may fail to achieve the required accuracy for these images because of the intensity differences. Although the majority of the images in the series can be registered with high accuracy by pair-wise registration, the erroneous or less-accurate registration results for the one or several unlike images, an effect known as misalignment, would result in an unreliable or even misleading diagnostic quantification.

Correcting for this effect is challenging because optimizing the alignment of multiple images requires a cost function that carries less computation burden, as well as possessing sharpness at the optimal point while being smooth over a relatively large parameter span. Furthermore, to alleviate or even eliminate misalignments, a groupwise registration, which takes into account group information, is preferred to a pairwise registration, which only considers the relation between two images and is unlikely to correct the misalignments. However, for a groupwise registration, the high dimensional parameter space brings increases the computational complexity of the optimization method, especially when high speed is required.

SUMMARY OF THE INVENTION

Exemplary embodiments of the invention as described herein generally include methods and systems for detecting misalignments in registration of a series of MR brain perfusion images using the profile of a group-wise energy function, the total variation of the intensities in consecutive images, and correcting the misalignments by a groupwise cost function using conditional optimization to minimize the dimension of the parameter space. According to an aspect of the invention, there is provided a method for correcting registration misalignment in magnetic resonance perfusion images, including receiving a time series of magnetic resonance images of an anatomical organ, each image comprising a plurality of intensities defined on an N-dimensional domain of points, performing a first group-wise registration of all images in the time series of images, using a pair-wise registration as an initialization, detecting a misaligned image from the group-wise registration by analyzing a total variation of intensity differences between consecutive images, and correcting the misaligned image by optimizing a second group-wise energy function over registration parameters of the misaligned image.

According to a further aspect of the invention, performing the first group-wise registration of all images comprises randomly selecting a proper subset of points from the domain of points, forming a quadratic variation cost function $$E = \sum_{n=1}^{N} \sum_{m=1}^{M} [I_n(T_n(x_m)) - I_{n'}(T_{n'}(x_m))]^2,$$

where $$n' = \begin{cases} N & \text{for } n = 1, \\ n-1 & \text{otherwise,} \end{cases}$$

where M is the number of randomly selected points, $x_m$ is a randomly selected point, N is the number of images in the time series of images, $I_n$ is an image in the time series of images, and $T_n$ is a rigid registration transformation, and finding a set of rigid transformations $T_n$ that minimize E, where the transformations $T_n$ are initialized by the initial pair-wise registration of all images.

According to a further aspect of the invention, finding a set of rigid transformations $T_n$ that minimize E comprises iterating $P_{i+1} = P_i + \delta P$ where $P_i$ is a set of registration parameters $P = [P_1, P_2, \ldots, P_N]$, where $P_i = \{p_{ik}, k=1, \ldots, 6\}$ are the rigid registration parameters for the transform $T_i$ at iteration step i, where $\delta P$ is defined by $$(J_Z^T(x)J_Z(x) + \lambda \text{diag}(J_Z^T(x)J_Z(x)))\delta P = -J_Z^T(x)Z(x),$$

where $J_Z(x)$ is the Jacobian matrix of function $Z(x)$ over the registration parameters P, where $Z_{nm}(x) = I_n(T_n(x_m)) - I_{n'}(T_{n'}(x_m))$, $J_Z^T(x)$ is the transpose of $J_Z(x)$, and $\lambda$ is a damping factor to reduce a size of a convergence step.

According to a further aspect of the invention, detecting a misaligned image comprises calculating a total intensity variation $F_n$ between each pair of consecutive images $I_n$ and $I_{n'}$, $$F_n = \sum_{n=1}^{N} |I_n(T_n(x_m)) - I_{n'}(T_{n'}(x_m))|,$$

where N is a total number of images, $$n' = \begin{cases} N & \text{for } n = 1, \\ n-1, & \text{otherwise,} \end{cases}$$

calculating $h_i = F_i - \max(F_{i-1}, F_{i+2})$, where transformation $T_i$ associated with variation $F_i$ is a misalignment if $h_i > \alpha \cdot \sigma$ where $\sigma$ is a standard deviation of the $F_n$'s and $\alpha$ is a predefined constant.

According to a further aspect of the invention, $\alpha \cdot \sigma$ adaptively determines a threshold for a peak height of $F_n$.

According to a further aspect of the invention, correcting the misaligned image comprises finding a set of rigid registration parameters $P_i = [p_{ik}]$, $k=1, \ldots, 6$, of the misaligned transformation $T_i$ that minimizes $\{E(P(P_i))|P_n, n \neq i\}$ where $P = [P_1, P_2, \ldots, P_N]$ is the set of registration parameters for all the images from the first group-wise registration where N is a total number of images, $E(P(P_i))$ is the second group-wise energy function calculated for P with varying $P_i$ and fixing $P_n$, with $n \neq i$.

According to a further aspect of the invention, the second group-wise energy function is different from the first group-wise energy function.

According to a further aspect of the invention, the second group-wise energy function is a voxel wise entropy function.

According to another aspect of the invention, there is provided a method of correcting registration misalignment in magnetic resonance perfusion images, including receiving a time series of magnetic resonance images of an anatomical organ, each image comprising a plurality of intensities defined on an N-dimensional domain of points, performing an initial rigid registration of all images in the time series of images, detecting a misaligned image from the group-wise registration by analyzing a total variation of intensity differences between consecutive images, and correcting the misaligned image by finding a set of rigid registration parameters $P_i = [p_{ik}]$, $k=1, \ldots, 6$, of the misaligned transformation $T_i$ that minimizes $\{E(P(P_i))|P_n, n \neq i\}$ where $P = [P_1, P_2, \ldots, P_N]$ is the set of registration parameters for all the images from the initial registration where N is a total number of images, $E(P(P_i))$ is a voxel-wise entropy calculated for P with varying $P_i$ and fixing $P_n$.

According to a further aspect of the invention, performing an initial rigid registration of all images comprises performing a first group-wise registration of all images in the time series of images, using a pair-wise registration as an initialization.

According to another aspect of the invention, there is provided a program storage device readable by a computer, tangibly embodying a program of instructions executable by the computer to perform the method steps for f correcting registration misalignment in magnetic resonance perfusion images.

BRIEF DESCRIPTION OF THE DRAWINGS

FIG. 1 is a flowchart of a method for detecting and correcting registration misalignments, according to an embodiment of the invention.

DETAILED DESCRIPTION OF EXEMPLARY EMBODIMENTS

Figure 2A:
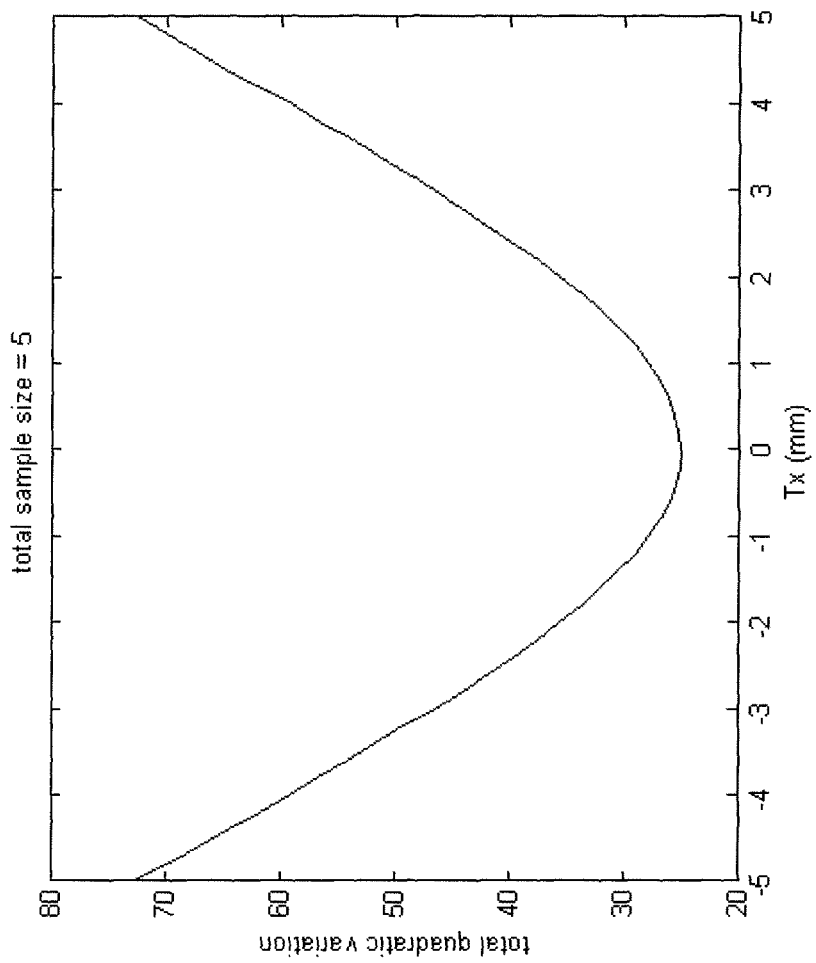
FIGS. 2(a)-(d) are graphs comparing different registration cost functions, according to an embodiment of the invention.
Figure 2B:
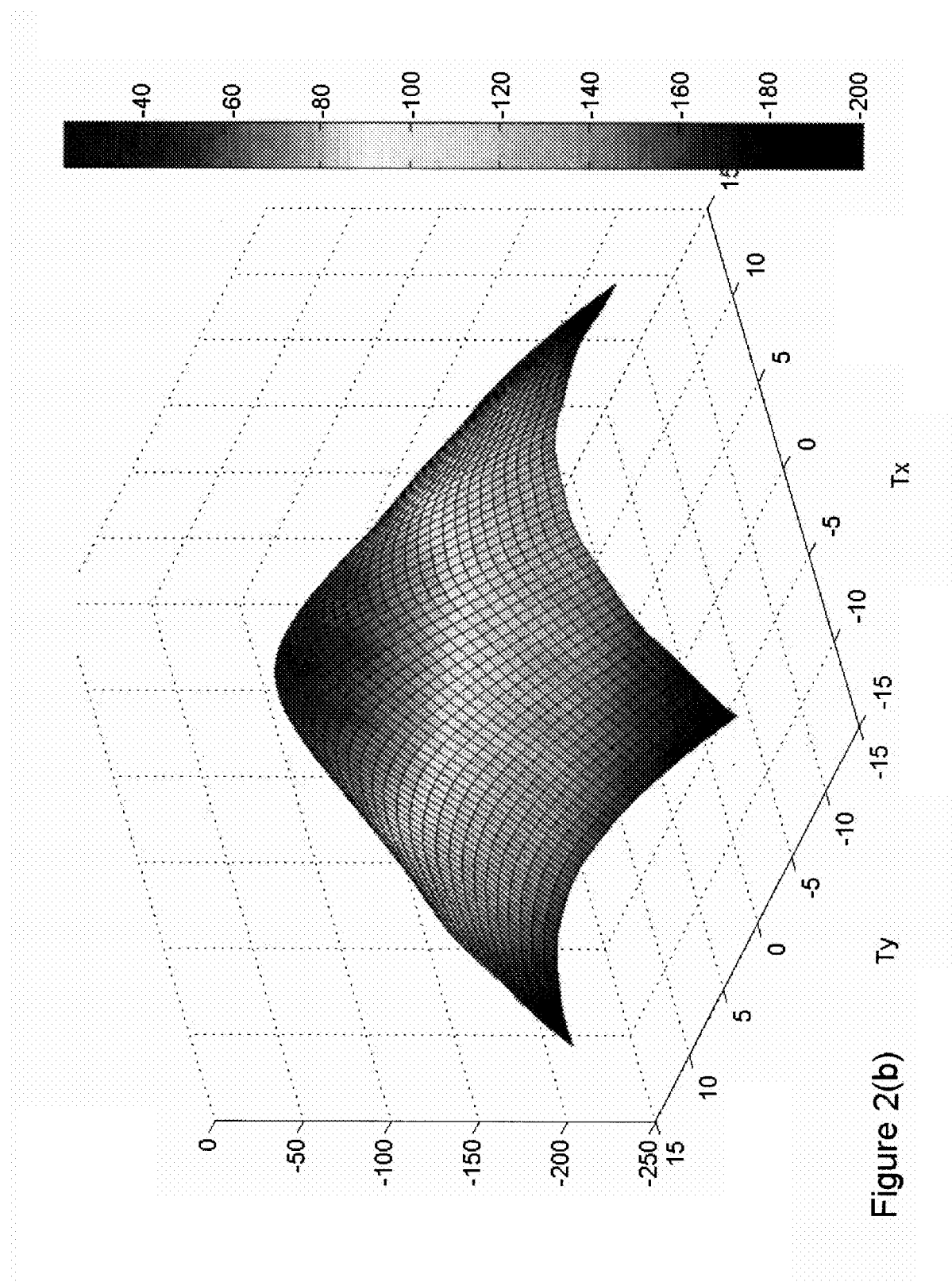

Exemplary embodiments of the invention as described herein generally include systems and methods for detecting and correcting registration misalignments in MR images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, where each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

A flowchart of a registration misalignment detection and correction method according to an embodiment of the invention is shown in FIG. 1. Referring now to the figure, given a series of 3-dimensional MR perfusion images, a method begins at step 11 with an initial rigid registration. A pair-wise registration is performed for all images in the series, which can provide accurate transformation for the majority of images being registered. Misalignment detection is performed next, at step 12. A curve of total variation between consecutive images is analyzed to identify the misaligned, outlier images. Misalignment correction is performed at step 13. A groupwise cost function is used to further search for the optimal parameters. The cost function in this step is optimized only over the outliers' registration parameters for robust and fast convergence.

During an initial registration of a three-step registration method according to an embodiment of the invention, each image in the time series may be rigidly registered to a reference image, selected from the time-series itself. Assuming that there is unlikely to be large motion from one image to the next, the result of one image's registration can be used as an initial guess for the next image in the series. This is accomplished by assuming an initial identity transformation between one image $I_n$ in a time-series and the next adjacent image $I_{n-1}$ and then finding the optimal transformation $T_1$ by optimizing the cost function. The resulting solution is then used as a starting point for the next optimization with the next image pair $I_n$, $I_{n+2}$.

The registration method used in the first step may possess the following features:

(1) Robustness: the convergence should be smooth over a large range of the parameter space; and (2) Computational efficiency: the cost function should permit the use of an optimization method with fast convergence, and the cost evaluation for each iteration should not be computationally expensive.

In general, any registration method can be used for the first step if it has the properties described above. Considering the computational efficiency requirement typically demanded in such applications, pairwise registrations between consecutive images are commonly used for motion correction in brain perfusion images. However, according to an embodiment of the invention, after a pairwise registration was used to initialize the parameter configuration, a groupwise registration was performed that computed the cost based on the total quadratic variation and was optimized by the Levenberg-Marquardt method. The total quadratic variation produces smooth convergence curves over a large offset range, and Levenberg-Marquardt method can be used to efficiently solve the least squares fitting task. FIGS. 2(a) and (b) respectively depict the convergence curve and surface of the total quadratic variation, for a sample size of 5 images.

The registration method used in the third step may have the following properties:

(1) a group-wise cost function may be used instead of a pair-wise cost function for its ability to recover misalignments in unlike images, as discussed above; and (2) the convergence curve may be sharp at the optimal point for a high level of accuracy.

Figure 2C:
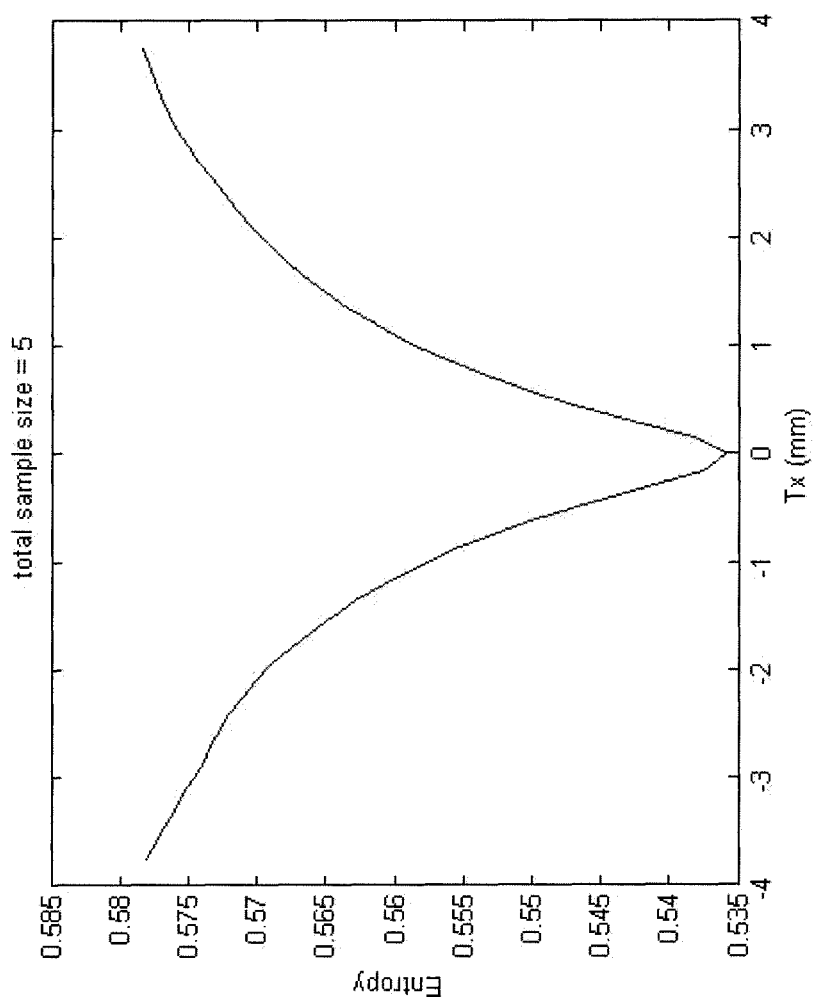
Figure 2D:
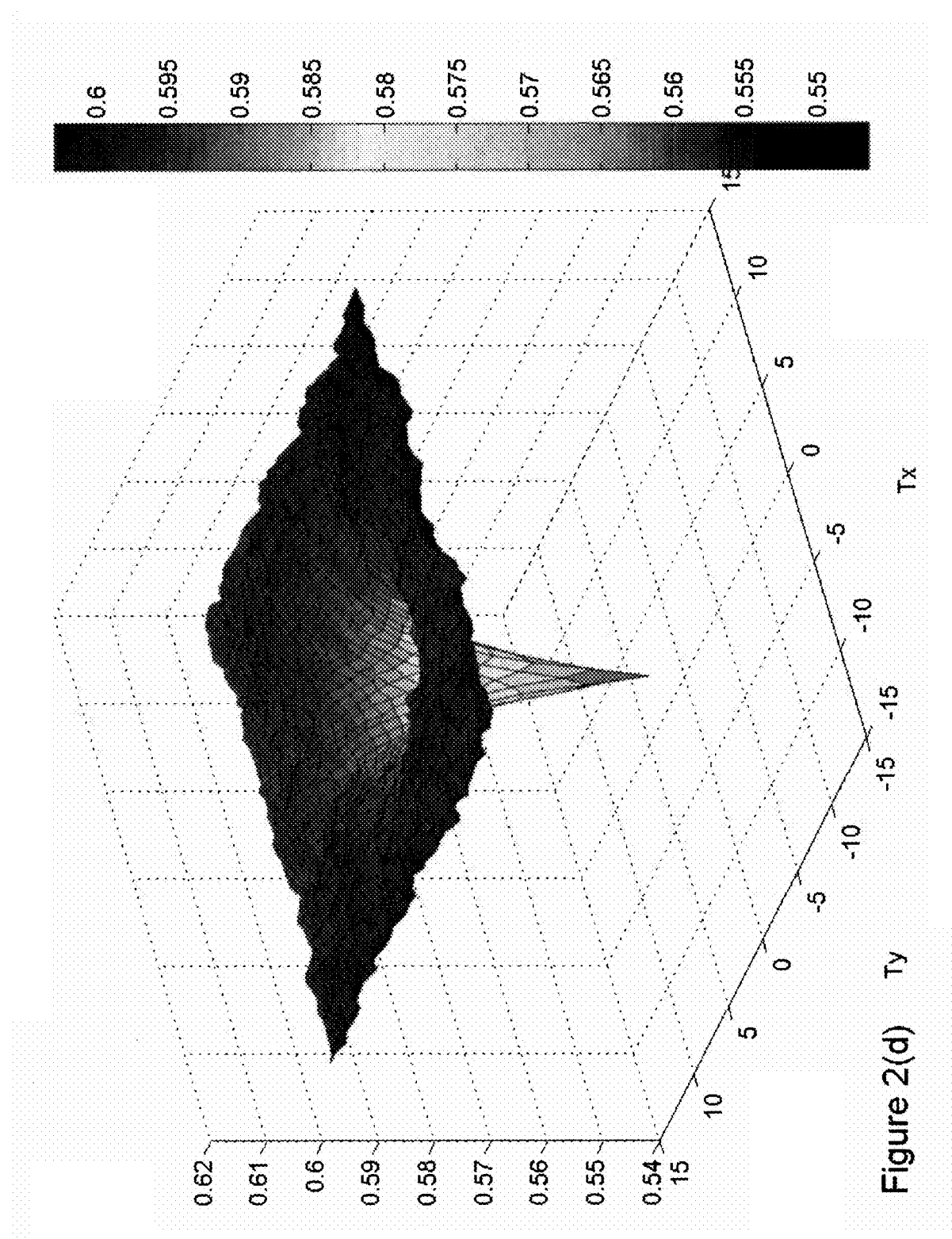

Similarly, any rigid registration method can be used for the third step if it has these properties. According to an embodiment of the invention, a voxel-wise entropy can be used for step 3 because of its sharp convergence curves, indicating the registration parameters can be optimized with high accuracy. FIGS. 2(c) and (d) respectively depict the convergence curve and surface of voxel-wise entropy for a sample size of 5 images.

In a three step method according to an embodiment of the invention, the first step can quickly produce a close-to-optimum solution with high robustness, and the third step can then perforin the optimization with a high level of accuracy using a different cost function. Thus a method according to an embodiment of the invention can combine desired features from different registration methods and achieve the outcome with high robustness, accuracy, and speed.

Group-Wise Registration

Like a pair-wise registration problem, there are two main components for a group-wise registration: cost function and optimization. The cost function is derived from the total quadratic variation of voxel intensity, and may be optimized over the registration parameters by a variation of the Gaussian-Newton optimization, the Levenberg-Marquardt method.

Let $\chi$ denote the image domain, then a random sample can be expressed as $x_m \in \chi$, $m=1, \ldots, M$, where M is the total number of random samples in the image domain. Let $I_n$, $n=1, \ldots, N$ denote the $n^{th}$ image in the group, where N is the total number of the images being registered. In the registration process, $I_n$ is deformed under a rigid transformation $T_n$. Then the total quadratic variation E of the image group $I_n$ is given by:

$$E = \sum_{n=1}^{N} \sum_{m=1}^{M} [I_n(T_n(x_m)) - I_{n'}(T_{n'}(x_m))]^2, \quad (1)$$

where $$n' = \begin{cases} N & \text{for } n = 1, \\ n-1 & \text{otherwise.} \end{cases}$$

Note that the indexes defined for EQ. (1) indicate a looped version of the total quadratic variations with an additional item $[I_1(T_1(x_m))-I_N(T_N(x_m))]^2$ in the summation so that all the images in the group would contribute equally to the cost function.

Let $Z(x)$ denote the matrix representation of intensity difference between images, where $[Z_{nm}]$ is the intensity difference between image $I'_n$ and $I_n$ at location $x_m$:

$$Z_{nm} = I_n(T_n(x_m)) - I_{n'}(T_{n'}(x_m)) \quad (2)$$

Thus the total quadratic variation E can also be given by a matrix representation:

$$E = \frac{1}{2} Z^T(x) Z(x) \quad (3)$$

Minimizing the total quadratic variation $$E = \frac{1}{2} Z^T(x) Z(x)$$

is a least squares problem and can be efficiently solved by Gauss-Newton iterations, and its variant, Levenberg-Marquart iterations.

To find the transformations for a group of images, the total quadratic variation E is minimized iteratively over the registration parameters $P=[P_1, P_2, \ldots, P_N]$, where $P_n=\{p_{nk}, k=1, \ldots, 6\}$ is the rigid registration parameters for the transform $T_n$, with $p_{n1}, p_{n2}, p_{n3}$ for the rotation angles, and $p_{n4}, p_{n5}, p_{n6}$ for the translation components.

For an iteration i, the approximate Newton step $\delta P$ is given by solving the linear system $$J_Z^T(x) \cdot J_Z(x) \cdot \delta P = -J_Z^T(x) \cdot Z(x), \quad (4)$$

where $J_Z^T(x)$ is the transpose of $J_Z(x)$, and $J_Z(x)$ is the Jacobian matrix of the residual function $Z(x)$ over the registration parameters P. Once the linear system in EQ. (4) is solved, the registration parameter estimate for next iteration i+1 can be calculated by $P_{i+1}=P_i+\delta P$.

The quadratic Newton step in EQ. (4) may cause over-shooting problem for convergence, especially for the group-wise registration since it performs optimization in a high-dimensional parameter space 6×(N−1). A damping factor $\lambda$ may be added to introduce a gradient factor in order to reduce the size of the quadratic convergence step:

$$(J_Z^T(x) J_Z(x) + \lambda \text{diag}(J_Z^T(x) J_Z(x))) \delta P = -J_Z^T(x) Z(x) \quad (5)$$

The damping factor $\lambda$ needs to be balanced between the convergence speed and the risk of over-shooting. The larger the damping factor, the smaller the convergence step, but less possibility of over-shooting. According to an embodiment of the invention, $\lambda$ is determined adaptively in the optimization process. Let $\lambda_i$ be the damping factor chosen for iteration i, then for iteration i+1, the damping factor would be chosen among $\Lambda=\{2^c \lambda_i, c=-1, 0, 1, \ldots, c_0\}$, where $c_0 \leq 10$ are predefined non-negative integer constants. Let $\delta P(\lambda)$ be the solution of EQ. (5) using $\lambda$, then $\delta P$ for iteration i+1 is given by $$\delta P_{i+1} = \arg(\delta P(\lambda), \lambda \in \Lambda) \min[E(P(\lambda))]. \quad (6)$$

EQ. (6) is used only when $\min_{\lambda \in \Lambda}[E(P(\lambda))] < E(P(\lambda_i))$. Otherwise, the iteration process has reached the convergence and should stop. Due to the high computational cost to evaluate E, the damping factor selection using EQ. (6) is applied only for the first several iterations to set the suitable damping amount and at the end of the iteration process to achieve high accuracy.

The complexity of high-dimensional parameter space in group-wise registration may lead to an un-expected local minimum if the starting point is far from the true optimum.

Meanwhile, the registration cost function evaluation at each iteration is also computationally expensive. For these reasons, a fast, but not necessarily very accurate pair-wise registration may be used to help initialize group-wise registration.

Misalignment Detection

The injection of a contrast agent in a brain perfusion study introduces a signal change in the subsequent images. Because of the continuous delivery of the contrast agent in blood vessels, this signal change is smooth over the consecutive images. Therefore the intensity profile for a fixed location in the image domain would also be smooth over the time course if all the images in the series are well aligned. The smoothness of the intensity profile can be characterized by the one-dimensional arc-length. In a method according to an embodiment of the invention, the smoothness of the signal change is characterized by the total variation $F = \int_\Omega f'(t)dt$, where $f'(t)$ is a real-valued function defined over $\Omega$, $\Omega \subset R$. Then the total variation $F_n$ between the consecutive images $I_n$ and $I_{n'}$ is given by:

$$F_n = \sum_{n=1}^{N} |I_n(T_n(x_m)) - I_{n'}(T_{n'}(x_m))|, \quad (7)$$

where || denotes the absolute value, N is the total number of images, and $$n' = \begin{cases} N & \text{for } n = 1, \\ n-1, & \text{otherwise.} \end{cases}$$

Figure 3:
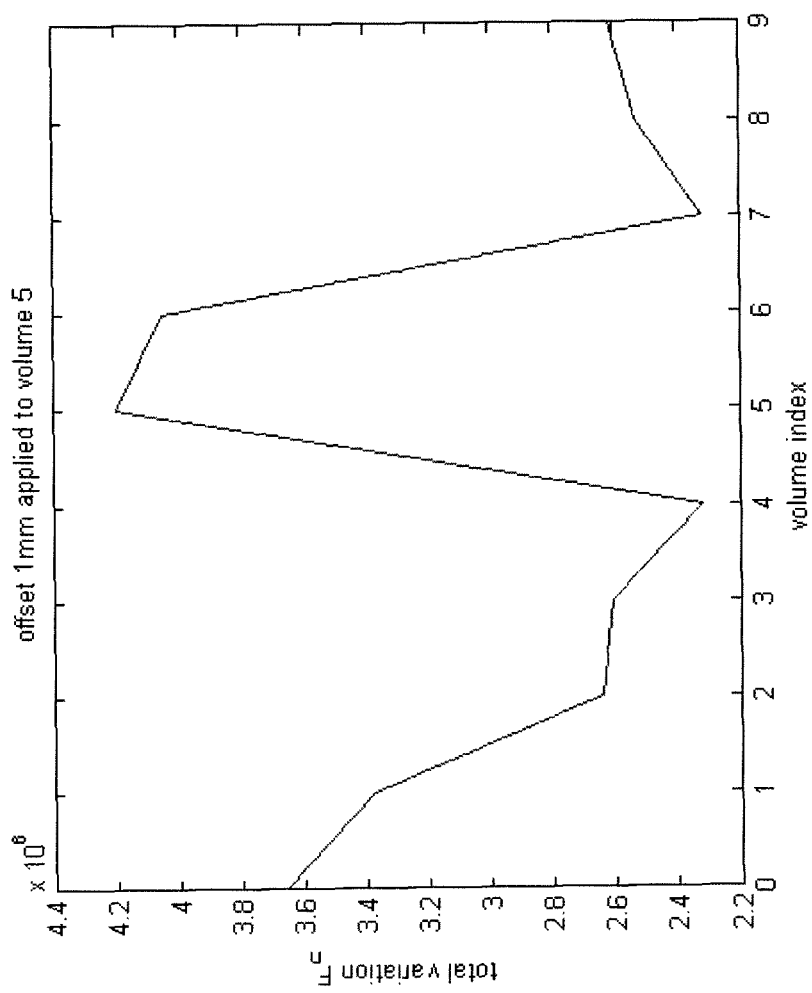
FIG. 3 is a graph of the total variation calculated for a series of images deformed under the known ground truth with an offset along the one direction for one image, according to an embodiment of the invention.

FIG. 3 is a graph of the total variation F calculated for a series of MR brain perfusion images deformed under a known ground truth with an offset of 1 mm along one direction for one image. It can be seen that even with a small 1 mm offset (a typical pixel spacing is 1.8×1.8 mm), a significant peak is observed along the $F_n$ curve, indicating the efficacy of the total variation for detecting misalignments. The misalignment $T_i$ for volume $I_i$ can be identified as follows:

$$h_i = F_i - \max(F_{i-1}, F_{i+2}), \quad (8)$$

$$\text{Is } T_i \text{ a misalignment?} \rightarrow \begin{cases} \text{yes,} & \text{if } h_i > \alpha \cdot \sigma; \\ \text{no,} & \text{otherwise,} \end{cases}$$

where $\sigma$ is the standard deviation of $F_n$, and $\alpha$ is a predefined constant. $\alpha \cdot \sigma$ is used to adaptively determine the threshold for the peak height.

Misalignment Correction

Let $P=[P_1, P_2, \ldots, P_N]$, where $P_n=[p_{nk}]$, $k=1, 2, \ldots$ denotes the registration parameters for all the images optimized in the first step. For rigid transformation $T_n$, the rotation angles may be denoted by $p_{n1}$, $p_{n2}$, $p_{n3}$, and the translation components may be denoted by $p_{n4}$, $p_{n5}$, $p_{n6}$. The misaligned transformation $T_i$ can be corrected to $\hat{T}_i$ using a groupwise cost function by conditional optimization:

$$\hat{P}_i = \arg(P_i) \min\{E(P(P_i))|P_n, n \neq i\}, \quad (9)$$

where $E(P(P_i))$ is a group-wise function, such as a voxel-wise entropy, calculated for P by varying $P_i$ and fixing $P_n$.

Voxel-Wise Entropy

An exemplary voxel-wise entropy was described in L. Zollei, E. Learned-Miller, E. Grimson, and W. Wells, "Efficient Population Registration of 3D Data", in LNCS Computer Vision for Biomedical Image Applications (ICCV), vol. 3765, pgs. 291-301, 2005, the contents of which are herein incorporated by reference in their entirety, and may be summarized as follows. If one denotes the collection of m input volumes as $I=\{I_1, I_2, \ldots, I_m\}$, then one seeks a set of m transformations, $T=\{T_1, T_2, \ldots, T_m\}$, with one transformation associated with each volume, such that the objective function $f$ of the total voxel-wise entropies is minimized. The objective function is then:

$$f(I, T) = f(T_1(I_1), \ldots, T_m(I_m)) = \quad (10)$$

$$\sum_{i=1}^{N} H(I(T(x_i))) = -\frac{1}{m} \sum_{i=1}^{M} \sum_{j=1}^{m} \log p(I_j(T_j(x_i))),$$

where $x_i$ is a location in the image domain, H is the Shannon entropy, p is the probability distribution of the voxel intensities, and N is the total number of voxel locations in the data coordinate system. This measure actually forms an upper bound on the true entropy of the image distribution. By minimizing this upper bound, one can approximate the minimum of the true entropy. An implementation according to an embodiment of the invention uses 6-parameter rigid transformations, with rotation followed by displacement. A voxel-wise entropy has the property that, when in proper alignment, intensity values at corresponding coordinate locations from all the inputs form a low entropy distribution, even if the intensity values are not identical. Thus, noise or bias fields, and corresponding multi-modal inputs can be accommodated.

To save on memory usage and to increase computational speed, a stochastic sampling framework and an entropy estimator are used. Instead of considering all the locations in the image coordinate space, a random selection was used. Then an approximation of the total sum of voxel-wise entropies is computed for a particular alignment configuration. The samples in this reduced set of coordinate locations are re-generated at each iteration of the algorithm. A coordinate descent optimization was used to guide the minimization of the objective function, along with an iterated stochastic gradient-based update mechanism that significantly reduces the processing time. A normalization step is included at the end of each iteration, where each transformation estimate is composed by the inverse of the mean transformation matrices. This update ensures that the average movement of points at corresponding coordinate locations is zero, thus preventing the images from drifting out of the field of view. A multi-resolution registration framework was also constructed. The processing of the data sets is started using down-sampled and smoothed image data and the results are refined during the higher resolution iterations. The number of hierarchy levels depends on the quality and the size of the original input images.

Results

Figure 4:
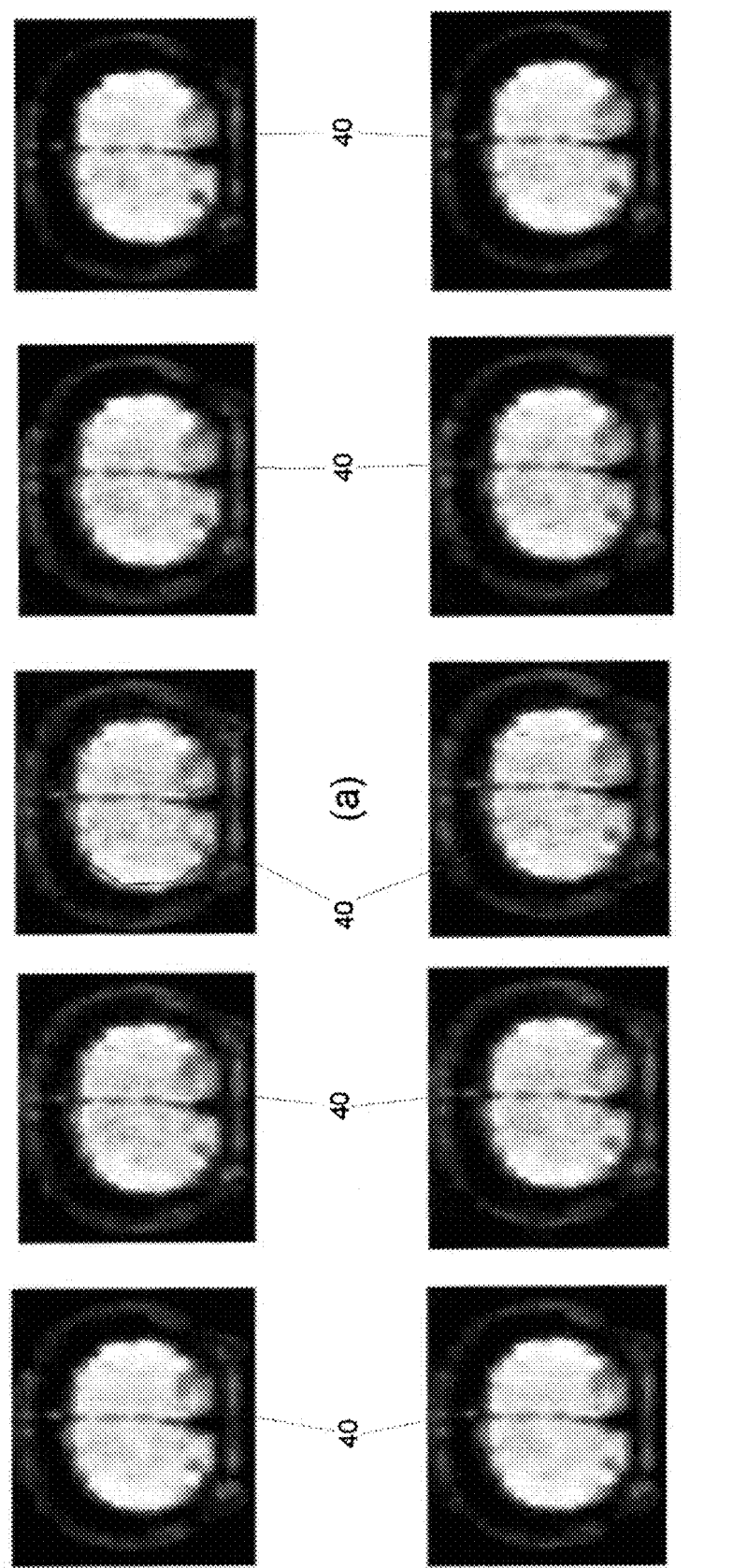
FIGS. 4(a)-(b) depict an ROI comparison of an MR brain perfusion study, according to an embodiment of the invention.

A misalignment detection and correction method according to an embodiment of the invention was validated with a brain perfusion study by comparing images overlaid with a fixed region of interest (ROI) before and after misalignment detection and correction. Note that a brain perfusion study is exemplary and non-limiting, and methods according to embodiments of the invention can be applied to perfusion studies of other organs and anatomical structures. Each perfusion scan in this study included 19 slices with a slice spacing of 6.50 mm, and a slice dimension of 128×128 pixels with a pixel spacing of 1.80 mm. FIGS. 4(a)-(b) compares the misalignment detection and correction results for 5 image slices in the MR brain perfusion study. FIG. 4(a) depicts the images before the correction of misalignment, and FIG. 4(b) depicts the images after the correction of misalignment. For each image, the ROI is the region outlined by the polygonal curve 40. For demonstration purpose, an offset of 4 mm along the X direction was artificially added to the third image after the initial registration. The consistent ROI location in (b) shows that an algorithm according to an embodiment of the invention can successfully compensate for the large offset.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
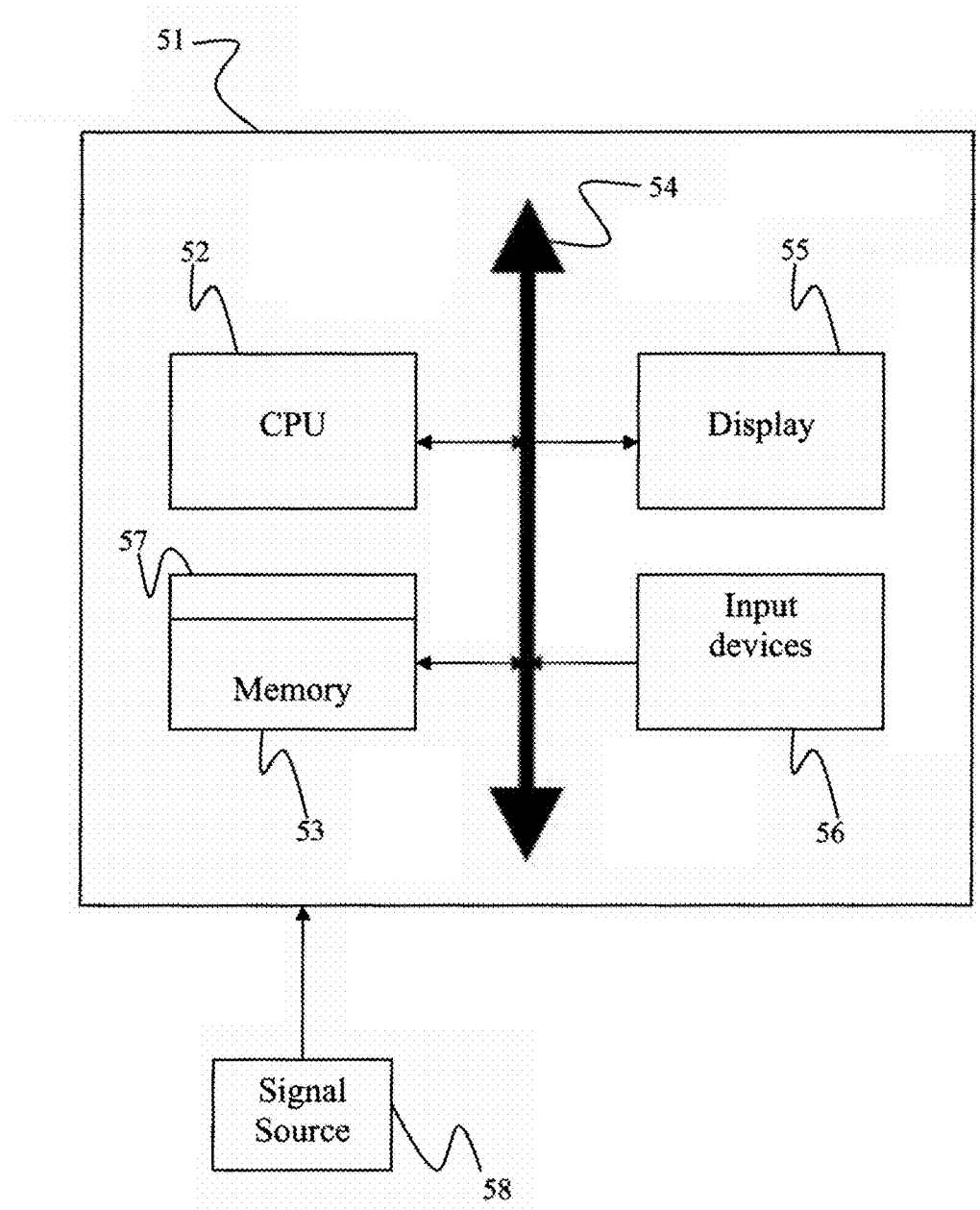
FIG. 5 is a block diagram of an exemplary computer system for implementing a method for detecting and correcting registration misalignments in MR images, according to an embodiment of the invention.

FIG. 5 is a block diagram of an exemplary computer system for implementing a method for detecting and correcting registration misalignments in MR images, according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of correcting registration misalignment in magnetic resonance perfusion images, the method comprising the steps of: receiving a time series of magnetic resonance images of an anatomical organ, each said image comprising a plurality of intensities defined on an N-dimensional domain of points; performing a first group-wise registration of all images in the time series of images, using a pair-wise registration as an initialization; detecting a misaligned image from said group-wise registration by analyzing a total variation of intensity differences between consecutive images; and correcting said misaligned image by optimizing a second group-wise energy function over registration parameters of said misaligned image, wherein correcting said misaligned image comprises finding a set of rigid registration parameters $P_i$= $[p_{ik}]$, k=1, . . . , 6, of said misaligned transformation $T_i$ that minimizes $\{E(P(P_i))|P_n, n \neq i\}$ wherein P=$[P_1, P_2, \ldots, P_N]$ is the set of registration parameters for all the images from said first group-wise registration wherein N is a total number of images, $E(P(P_i))$ is said second group-wise energy function calculated for P with varying $P_i$ and fixing $P_n$, with $n \neq i$.

2. The method of claim 1, wherein performing said first group-wise registration of all images comprises randomly selecting a proper subset of points from said domain of points, forming a quadratic variation cost function $$E = \sum_{n=1}^{N} \sum_{m=1}^{M} [I_n(T_n(x_m)) - I_{n'}(T_{n'}(x_m))]^2,$$

where $$n' = \begin{cases} N & \text{for } n = 1, \\ n-1 & \text{otherwise,} \end{cases}$$

wherein M is the number of randomly selected points, $x_m$ is a randomly selected point, N is the number of images in said time series of images, $I_n$ is an image in said time series of images, and $T_n$ is a rigid registration transformation, and finding a set of rigid transformations $T_n$ that minimize E, wherein the transformations $T_n$ are initialized by the initial pair-wise registration of all images.

3. The method of claim 2, wherein finding a set of rigid transformations $T_n$ that minimize E comprises iterating $P_{i+1}=P_i+\delta P$ wherein $P_i$ is a set of registration parameters P=$[P_1, P_2, \ldots, P_N]$, where $P_i=\{p_{ik}, k=1, \ldots, 6\}$ are the rigid registration parameters for the transform $T_i$ at iteration step i, wherein $\delta P$ is defined by $$(J_Z^T(x)J_Z(x)+\lambda \text{diag}(J_Z^T(x)J_Z(x)))\delta P=-J_Z^T(x)Z(x),$$

wherein $J_Z(x)$ is the Jacobian matrix of function Z(x) over the registration parameters P, wherein $Z_{nm}(x)=I_n(T_n(x_m))-I_{n'}(T_{n'}(x_m))$, $J_Z^T(x)$ is the transpose of $J_Z(x)$, and $\lambda$ is a damping factor to reduce a size of a convergence step.

4. The method of claim 1, wherein detecting a misaligned image comprises calculating a total intensity variation between each pair of consecutive images $I_n$ and $I_{n'}$ $$F_n = \sum_{n=1}^{N} |I_n(T_n(x_m)) - I_{n'}(T_{n'}(x_m))|,$$

wherein N is a total number of images, $$n' = \begin{cases} N & \text{for } n = 1, \\ n-1, & \text{otherwise,} \end{cases}$$

calculating $h_i = F_i - \max(F_{i-1}, F_{i+2})$, wherein transformation $T_i$ associated with variation $F_i$ is a misalignment if $h_i > \alpha \cdot \sigma$ wherein $\sigma$ is a standard deviation of the $F_n$'s and $\alpha$ is a predefined constant.

5. The method of claim 4, wherein $\alpha \cdot \sigma$ adaptively determines a threshold for a peak height of $F_n$.

6. The method of claim 1, wherein said second group-wise energy function is different from the first group-wise energy function.

7. The method of claim 6, wherein said second group-wise energy function is a voxel wise entropy function.

8. A method of correcting registration misalignment in magnetic resonance perfusion images, said method comprising the steps of:
   receiving a time series of magnetic resonance images of an anatomical organ, each said image comprising a plurality of intensities defined on an N-dimensional domain of points;
   performing an initial rigid registration of all images in said time series of images;
   detecting a misaligned image from said group-wise registration by analyzing a total variation of intensity differences between consecutive images; and
   correcting said misaligned image by finding a set of rigid registration parameters $P_i = [p_{ik}]$, $k=1, \ldots, 6$, of said misaligned transformation $T_i$ that minimizes $\{E(P(P_i)) | P_n, n \neq i\}$ wherein $P = [P_1, P_2, \ldots, P_N]$ is the set of registration parameters for all the images from said initial registration wherein N is a total number of images, $E(P(P_i))$ is a voxel-wise entropy calculated for P with varying $P_i$ and fixing $P_n$.

9. The method of claim 8, wherein performing an initial rigid registration of all images comprises performing a first group-wise registration of all images in the time series of images, using a pair-wise registration as an initialization.

10. A program storage device readable by a computer, tangibly embodying a program of instructions executable by the computer to perform the method steps for correcting registration misalignment in magnetic resonance perfusion images, said method comprising the steps of:
   receiving a time series of magnetic resonance images of an anatomical organ, each said image comprising a plurality of intensities defined on an N-dimensional domain of points;
   performing a first group-wise registration of all images in the time series of images, using a pair-wise registration as an initialization;
   detecting a misaligned image from said group-wise registration by analyzing a total variation of intensity differences between consecutive images; and
   correcting said misaligned image by optimizing a second group-wise energy function over registration parameters of said misaligned image, wherein correcting said misaligned image comprises finding a set of rigid registration parameters $P_i = [p_{ik}]$, $k=1, \ldots, 6$, of said misaligned transformation $T_i$ that minimizes $\{E(P(P_i)) | P_n, n \neq i\}$ wherein $P = [P_1, P_2, \ldots, P_N]$ is the set of registration parameters for all the images from said first group-wise registration wherein N is a total number of images, $E(P(P_i))$ is said second group-wise energy function calculated for P with varying $P_i$ and fixing $P_n$, with $n \neq i$.

11. The computer readable program storage device of claim 10, wherein performing said first group-wise registration of all images comprises randomly selecting a proper subset of points from said domain of points, forming a quadratic variation cost function $$E = \sum_{n=1}^{N} \sum_{m=1}^{M} [I_n(T_n(x_m)) - I_{n'}(T_{n'}(x_m))]^2,$$

where $$n' = \begin{cases} N & \text{for } n = 1, \\ n - 1 & \text{otherwise,} \end{cases}$$

wherein M is the number of randomly selected points, $x_m$ is a randomly selected point, N is the number of images in said time series of images, $I_n$ is an image in said time series of images, and $T_n$ is a rigid registration transformation, and finding a set of rigid to transformations $T_n$ that minimize E, wherein the transformations $T_n$ are initialized by the initial pair-wise registration of all images.

12. The computer readable program storage device of claim 11, wherein finding a set of rigid transformations $T_n$ that minimize E comprises iterating $P_{i+1} = P_i + \delta P$ wherein $P_i$ is a set of registration parameters $P = [P_1, P_2, \ldots, P_N]$, where $P_i = \{p_{ik}, k=1, \ldots, 6\}$ are the rigid registration parameters for the transform $T_i$ at iteration step i, wherein $\delta P$ is defined by $$(J_Z^T(x) J_Z(x) + \lambda \mathrm{diag}(J_Z^T(x) J_Z(x))) \delta P = -J_Z^T(x) Z(x),$$

wherein $J_Z(x)$ is the Jacobian matrix of function $Z(x)$ over the registration parameters P, wherein $Z_{nm}(x) = I_n(T_n(x_m)) - I_{n'}(T_{n'}(x_m))$, $J_Z^T(x)$ is the transpose of $J_Z(x)$, and $\lambda$ is a damping factor to reduce a size of a convergence step.

13. The computer readable program storage device of claim 10, wherein detecting a misaligned image comprises calculating a total intensity variation $F_n$ between each pair of consecutive images and $I_n$ and $I_{n'}$, $$F_n = \sum_{n=1}^{N} |I_n(T_n(x_m)) - I_{n'}(T_{n'}(x_m))|,$$

wherein N is a total number of images, $$n' = \begin{cases} N & \text{for } n = 1, \\ n - 1, & \text{otherwise,} \end{cases}$$

calculating $h_i = F_i - \max(F_{i-1}, F_{i+2})$, wherein transformation $T_i$ associated with variation $F_i$ is a misalignment if $h_i > \alpha \cdot \sigma$ wherein $\sigma$ is a standard deviation of the $F_n$'s and $\alpha$ is a predefined constant.

14. The computer readable program storage device of claim 13, wherein $\alpha \cdot \sigma$ adaptively determines a threshold for a peak height of $F_n$.

15. The computer readable program storage device of claim 10, wherein said second group-wise energy function is different from the first group-wise energy function.

16. The computer readable program storage device of claim 15, wherein said second group-wise energy function is a voxel wise entropy function.

* * * * *